March 31, 1970  SENNOSUKE SATO ET AL  3,503,248
METHOD FOR DETERMINING A HEAT TREATMENT
TEMPERATURE FOR CARBON AND GRAPHITE
Filed April 14, 1967  2 Sheets-Sheet 1

Graphitization Temperature

United States Patent Office 3,503,248
Patented Mar. 31, 1970

3,503,248
METHOD FOR DETERMINING A HEAT TREATMENT TEMPERATURE FOR CARBON AND GRAPHITE
Sennosuke Sato, Toshio Honda, and Hisanori Ito, Naka-gun, Ibaraki-ken, Japan, assignors to Japan Atomic Energy Research Institute, Tokyo, Japan
Filed Apr. 14, 1967, Ser. No. 631,029
Claims priority, application Japan, June 8, 1966, 41/36,542
Int. Cl. G01m 25/00
U.S. Cl. 73—15
1 Claim

ABSTRACT OF THE DISCLOSURE

A method for determining the heat treatment temperature of carbon or graphite materials in the manufacturing process of graphite comprises forming a plurality of sample sticks of a material of the same composition and preselected orientation as the parent material after molding or calcination thereof but before heat treatment, applying heat treatment to the plurality of sample sticks to produce a plurality of heat treated samples at predetermined temperature intervals within the range of the inner temperature of the graphitization furnace and forming thermocouples with selected sample sticks and the heat-treated parent material to determine which sample stick, when its junction with the parent material is formed, produces the minimum thermo-electric output. Thereby the sample stick producing the minimum thermo-electric output is used to determine the condition of the heat treatment of the parent material.

---

This invention relates to a method for determining a heat treatment temperature for artificial graphite and carbon. While graphite is used because of its physical and chemical properties as electrodes for electrolytic and electric furnaces, crucibles, electric brushes, structural materials for chemical apparatus, high temperature resistant materials, moderators and reflectors for atomic reactors and the like, artificial graphite is usually used which is obtained by the heat treatment of amorphous carbon made by the carbonization of organic substances to a high temperature, more than about 2,500° C. The performance of these graphites is mainly determined by the degree of graphitization, and the degree of graphitization may vary depending upon the constituents of the raw material and the temperature of the heat treatment. However, the heat treatment is one of the most important steps in the manufacture of graphite, and the proper control thereof has a great effect upon the performance and the manufacturing cost price of graphite. While it is desirous to measure the heat treatment temperature of graphitization accurately, in general, it has been rather difficult to make an accurate measurement of the temperature. For example, in an industrial graphitization furnace, several sample materials have been taken from several points near the outer wall and their temperatures have been measured by an optical pyrometer, and the temperature of the remaining major part of the materials, for example, several tons to several hundred tons of the materials, is based thereon. Therefore, to control the graphitization process, it becomes necessary to measure the degree of graphitization of the material after the heat treatment. To measure the degree of graphitization quantitatively, the most accurate method is to measure the interlayer spacing in the crystal structure of the graphite by the X-ray diffraction method. Further, in some cases, the size of the interlayer is measured. Even though the degree of graphitization is measured accurately in these methods, it is necessary therein to pulverize about 2 grams of the sample to a specified particle size and mix the same with a standard sample, such as silicon and the like in order to prepare a sample for the X-ray analysis, whereafter diffraction line positions are analyzed by an X-ray diffractometer. Therefore, considerable time and effort are required and the method is not suitable for practical operation in a factory. Accordingly, the heat treatment temperature and the degree of graphitization are obtained by measuring a simple physical quantity which is varied depending upon the heat treatment temperature of graphitization. There are various methods for determining the degree of graphitization such as measuring an electrical property by using the fact that electric resistance is decreased as the graphitization temperature is raised; measuring the apparent or the true density as a macroscopic measure in a pyrolytic diffusion during the high temperature heat treatment; measuring the mechanical strength, the elasticity, the cutting performance or the abrasion property; and measuring the heat conductivity and the thermal expansion coefficient. The above-mentioned methods are not effective for determining the degree of graphitization since they have no quantitativity except for the electric resistance or they require very complicated procedures in measuring, even though those methods give physical quantities.

The method of this invention belongs to a category of a method of measuring electrical properties, and is directed to the thermoelectric power effect of soft carbon (conventional artificial graphite) and hard carbon (charcoal, sugar coal, glassy carbon and the like), upon the heat treatment temperature of carbon or graphite. In the method of this invention, a material having the same composition as the parent material is taken up after the material has been molded at about 150° C. or has been calcinated, and the material is subjected to heat treatment at each stage of the temperature in a separate furnace for determining the degree of graphitization (as will be described hereunder). By taking this as a reference material and comparing the thermoelectric power of the material which has been subjected to the conventional graphitization process with that of the reference material, the degree of graphitization or the heat treatment temperature can be determined.

The reference material described above is formed into a round stick, about 1 cm. in diameter and 10 cm. to 20 cm. in length, calcinated under the same conditions as in the extrusion pressure, so that its direction and the temperature correspond with those of the parent material, and if necessary, is subjected to a stepwise heat treatment variation of about 50° C. The number of required samples may be varied depending upon the expectation of the inner temperature of the graphitization furnace. Thus, assuming that the inner temperature is in the range of 2,200° C. to 3,000° C. and the interval is 50° C., the number, then, becomes 17.

For a better understanding of the invention, as well as other objects and further features thereof, reference is had to the following detailed description of the invention in conjunction with the accompanying drawings, wherein.

Figure 3:
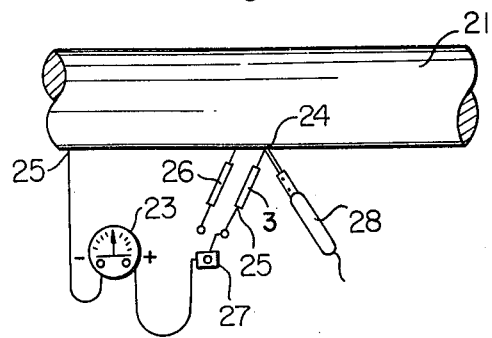
Figure 4:
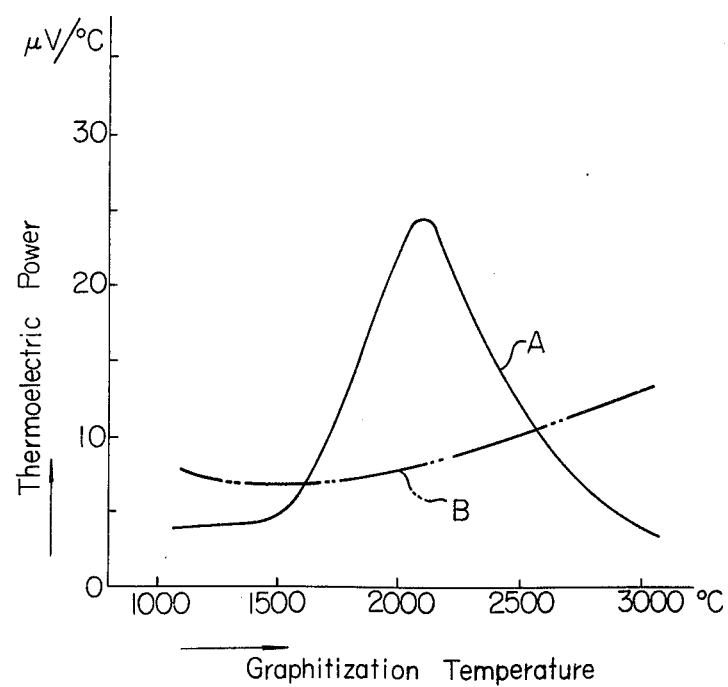

FIG. 3 diagrammatically illustrates the operation of the method applied to a large mass of graphite material; and FIG. 4 is a graph showing the relationship between heat treatment temperature of graphitization for various carbon materials and thermoelectric power for platinum.

Figure 1:
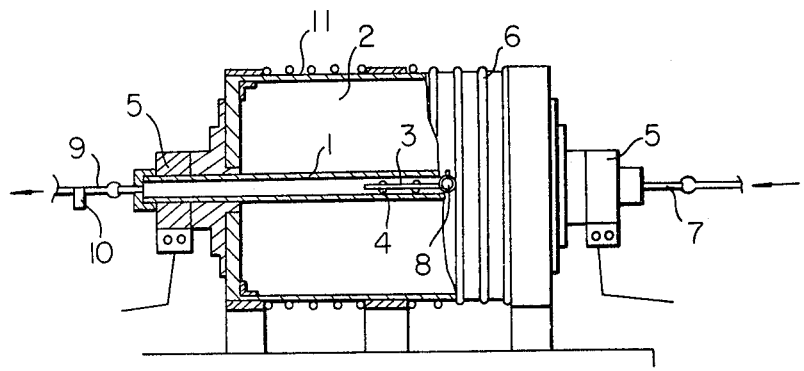
FIG. 1 is a side view of the furnace for determining a heat treatment temperature of graphitization of a sample stick, partly broken away and in section.

The furnace for determining the graphitization used in this invention is a resistance furnace of the direct heating type with a core 1 of a graphite tube, 30 mm. in inside diameter and about 3 mm. to 5 mm. thick, as shown in FIG. 1. The outside space 2 around the core 1 is filled with an insulating carbon powder, and three graphite cylinders 4 covered with transparent quartz glass on their outer surfaces are mounted so that the temperature at the center and both ends of a sample stick 3 placed in the center of the said graphite tube may be measured by a standard pyrometer or a radiation thermometer. An electrode terminal 5 of the furnace core 1 of the graphite tube is cooled with water and a cylindrical gas-tight muffle 11 is, if necessary, surrounded by a water-cooled coil 6. Further, to prevent the oxidation of the furnace core and the samples, an inert gas such as nitrogen is charged through one end 7 of the graphite tube and the opening end 8 for measuring the temperature, and discharged from the other end 9 of the furnace core tube through a flowmeter 10. Assuming that the length of the sample stick 3 is 20 cm., the furnace core tube 1 is several times longer than the stick. However, the length may be reduced by designing the section of the furnace core tube effectively.

Strictly speaking, the graphitization procedure may be effected not only by the temperature but also by the pressure or the loading stress, the sustaining period, the atmosphere, and the like. Assuming that the sample stick is about 1 cm. in diameter, the sustaining period at the maximum temperature may be about 20 minutes under ordinary atmospheric pressure.

Figure 2:
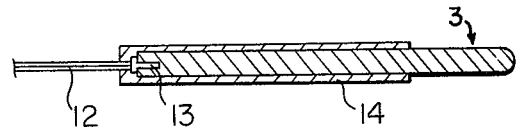
FIG. 2 is a longitudinal sectional view of the sample stick.

Sample sticks 3 heat-treated at each step of the temperature, as described above, are each constructed as seen in FIG. 2 wherein a conductive lead wire 12 is fixed to one end of the stick through a screw 13, a said stick being inserted into a protective tube 14 of an insulating material, its leading edge projecting from the protective tube.

FIG. 3 denotes the condition for measuring a large graphite electrode 21 for an electric furnace by using the said sample stick 3 and an electrometer 23. Assuming that no difference in temperature is obtained between a hot junction 24 and a cold junction 25 of both materials, the indicator of the electrometer will be at rest at the center. When the hot junction 24 is then heated, the indicator is moved toward the side of the greater thermoelectric power by the thermal electromotive force. The thermoelectric power of soft carbon, to which conventional artificial graphite belongs, has maximum thermoelectric power in the vicinity of 2,100° C. as shown at A in FIG. 4, and the thermoelectric power is reduced as the heat treatment temperature is further increased. Further, curve B in FIG. 4 represents glassy carbon as a hard carbon. Thus, when the indicator of the electrometer 23 is moved toward the positive side (+), the measurement is continued by switching the contact from the sample stick 3 to another sample stick 26 of higher heat treatment temperature through a rotary switch 27. Thus, by finding the sample stick at which the thermal electromotive force is changed from positive (+) to negative (−), the heat treatment temperature of the electrode material 21 is determined from that of the particular sample stick. While the higher hot junction 24 gives the higher sensitvity, there is no need to heat to a temperature of more than 200° C. Since the heating is required only for the relative difference in temperature, it is sufficient to use a soldering iron 28 as a heater for several seconds of contact.

In determining the positions of junctions 24 and 25 in FIG. 3, it is occasionally required in polycrystalline soft carbon to select the same in the same direction as the one in which the sample stick is sampled, because an anisotropy in an electronic property may be occasionally caused depending upon the extrusion pressure and the precipitation direction. That is, when two pairs of sample sticks are taken in two directions of the parent material for the sample stick and the thermo-electric power of the respective sticks is compared with each other, not only may anisotropy be avoided but also the orientation which cannot be known by the X-ray diffraction method can be determined. The accuracy of the measurement may vary somewhat depending upon the temperature steps of the sample sticks. However, when the heat treatment temperature of the sample sticks has an interval of 50° C. a result limited within ±25° C. corresponding to about half of the said interval may be obtained, since it is easily determined to which temperature of the two sample sticks the heat treatment temperature of the sample is closer.

In summary, in the hitherto heat treatment in the industrial production of a carbon material, the heat treatment temperature has been presumed to have an error of about 200° C. to 300° C. at about 2,500° C., but in the present invention, the heat treatment temperature can be determined easily at an accuracy of less than the temperature interval of the sample stick i.e. at an accuracy of 25° C. The condition of the graphitization procedure at any point including the distribution and the anisotropy effect can be determined easily with good sensitivity, regardless of the size and the shape of the carbon material, so that graphitization requiring a remarkably large electric power can be determined with an improved efficiency. The heat treatment temperature of the graphitization of carbon and graphite products as well as the degree of crystal growth can also be estimated, so that the method of this invention may be used for achieving effective control over the products and for determining the heat treatment temperature for carbon and graphite.

What is claimed is:

1. In the manufacturing process of carbon and graphite, the method of determining the heat treatment temperature of carbon or graphite materials at a point in the process after the molding or calcination of the carbon which comprises: sampling a plurality of sticks of a material of the same composition and preselected orientation as the parent material, after molding or calcination but before heat treatment; applying a heat treatment to said plurality of sample sticks to produce a plurality of heat treated samples at predetermined temperature intervals within the range of the inner temperature of the graphitization furnace, forming thermocouples with selected sample sticks and the heat treated parent material to determine which sample stick, when its junction with the parent material is formed, produces the minimum thermoelectric output, whereby said sample stick producing said minimum thermo-electric output is used to determine the condition of the heat treatment of said parent material.

References Cited

"The Variation in the Resistance of Carbon and Graphite with Temperature," by Bradford Noyes, Jr., Physical Review, pp. 190–199, vol. 24, No. 2, August 1924.

JAMES J. GILL, Primary Examiner

H. GOLDSTEIN, Assistant Examiner